US005600226A

United States Patent [19]

Falcon

[11] Patent Number: 5,600,226
[45] Date of Patent: Feb. 4, 1997

[54] METHODS OF CONTROLLING THE APPLICATION AND TERMINATION OF CHARGE TO A RECHARGEABLE BATTERY

[75] Inventor: Carl B. Falcon, Royersford, Pa.

[73] Assignee: Galaxy Power, Inc. A Pennsylvania Corporation, Valley Forge, Pa.

[21] Appl. No.: 135,923

[22] Filed: Oct. 13, 1993

[51] Int. Cl.⁶ .................................................. H01N 10/44
[52] U.S. Cl. ................................. 320/20; 320/24; 320/39; 320/48
[58] Field of Search ............................. 370/20, 22, 24, 370/31, 32, 39, 37, 35, 46, 21, 40, 38, 48

[56] References Cited

U.S. PATENT DOCUMENTS

| | | | |
|---|---|---|---|
| 3,597,673 | 8/1971 | Burkett et al. | 320/20 X |
| 3,936,718 | 2/1976 | Melling et al. | 320/20 |
| 4,134,056 | 1/1979 | Fukui et al. | 320/20 |
| 4,227,141 | 10/1980 | Cross | 320/20 |
| 4,354,148 | 10/1982 | Tada et al. | 320/20 |
| 4,385,269 | 5/1983 | Aspinwall et al. | 320/20 X |
| 4,388,582 | 6/1983 | Saar et al. | 320/20 |
| 4,392,101 | 7/1983 | Saar et al. | 320/20 |
| 4,503,378 | 3/1985 | Jones et al. | 320/20 |
| 4,639,655 | 1/1987 | Westhaver et al. | 320/20 X |
| 4,677,363 | 6/1987 | Kopmann | 320/20 X |
| 4,746,852 | 5/1988 | Martin | 320/20 |
| 4,746,854 | 5/1988 | Baker et al. | 320/20 X |
| 4,755,735 | 7/1988 | Inakagata | 320/20 X |
| 4,767,977 | 8/1988 | Fasen et al. | 320/20 |
| 4,806,840 | 2/1989 | Alexander et al. | 320/20 |
| 4,829,225 | 5/1989 | Podrashansky et al. | 320/20 X |
| 4,855,663 | 8/1989 | Matsui et al. | 320/20 |
| 4,959,604 | 9/1990 | Cuesta | 320/20 |
| 5,140,251 | 8/1992 | Wu | 320/20 X |
| 5,140,252 | 8/1992 | Kisa et al. | 320/20 |
| 5,180,961 | 1/1993 | Tsujino | 320/20 |
| 5,350,996 | 9/1994 | Tauchi | 320/22 |

*Primary Examiner*—Edward H. Tso
*Attorney, Agent, or Firm*—Cohen, Pontani, Lieberman, Pavane

[57] ABSTRACT

As a substantially constant charge current is applied to a battery, the voltage is periodically measured and the slope of the voltage characteristic is calculated. The minimum slope of the bottom peak of the slope profile is dynamically identified and, as appropriate, updated and stored. With each identification and update of the minimum slope, a trigger threshold between the minimum slope and top peak is defined, and then stored, by adding a trigger value to the minimum slope. A termination threshold or value between the minimum slope and the trigger threshold may also be calculated and stored with each such identification and update of the minimum slope. When the calculated slope, increasing from the bottom peak, reaches the trigger threshold, the method is armed—as by setting a trigger threshold flag—so that when the calculated slope thereafter once again passes through the trigger threshold and then reaches the termination threshold, full-current charging of the battery is terminated. The termination threshold—which identifies the substantially fully-charged state of the battery—may, in some forms of the invention, be preset to equal the minimum slope value. Premature termination resulting from a high impedance spike or inflection point occurring in the voltage profile when charging current is initially applied to the battery may be avoided by gradually increasing the applied charging current at the beginning of the charging process.

52 Claims, 6 Drawing Sheets

METHODS OF CONTROLLING THE APPLICATION AND TERMINATION OF CHARGE TO A RECHARGEABLE BATTERY

FIELD OF THE INVENTION

The present invention is directed to the charging of rechargeable batteries or cells and, more particularly, to methods of controlling the rapid charging of such cells so as to terminate the application of charge to the cells at that point at which they have attained a substantially full or peak charge.

BACKGROUND OF THE INVENTION

A rechargeable battery, such as one of nickel-cadmium construction, to which electrical energy is being applied is generally considered to have reached the state of so-called full charge when the applied energy has an easier time breaking down the alkaline electrolyte than converting the uncharged material at the battery plates into a charged state for storage as chemical energy. At that point, the pressure within the battery casing is rapidly rising as the electrolyte breaks down into gaseous compounds. Because the chemical breakdown of the electrolyte is exothermic, the internal battery temperature is also rising rapidly. At the same time, the cell impedance begins to drop due to a combination of increasing temperature and the lowering of the potential energy required to electrolyze the chemical electrolyte. Thus, attainment of the fully-charged state can, at least theoretically, be determined by monitoring any of three parameters—i.e. the internal cell pressure, the internal cell temperature or, by measuring the battery voltage as a constant charging current is applied, the cell impedance.

The sealed nature of most rechargeable batteries currently available in the consumer market renders the internal cell pressure an unavailable parameter for sensing the charge state of a battery. Similarly, absent a temperature probe placed at an appropriate location within the battery interior by the manufacturer, temperature measurements are indirect at best and, in addition, cell temperature is oftentimes influenced by other factors not directly related to the charge state. Moreover, at high charge rates a temperature-based termination procedure is often too slow or inaccurate to effectively locate a repeatable point of peak charge.

Considerable attention has therefore been directed to identifying the fully-charged condition of a battery under charge by monitoring its voltage as a substantially constant current is applied to the battery. Some of the heretofore-known methods or apparatus for thereby determining the state of charge are difficult or unrealistically costly to implement, requiring significant amounts of dynamic processing power and data storage. Others provide termination decisions of questionable repeatability or that otherwise lack reliability, providing no better than an educated prediction or guesstimate of the attainment of full or peak charge. Still others provide for termination when the battery has attained what is likely to be almost a full charge, trading the ability or expectation of accurately identifying the fully-charged state for a mere reduction in charge rate, as the point of peak charge nears, to one sufficiently low to permit continued long-term or extended duration charging and thereby lessening the risk or likelihood of damage to the battery at the cost of a longer total charge time. However, when it is desired to employ high rates of charge—as is generally most preferred to enable charging of a battery and permit its reuse in the shortest possible time—it is essential that charging take place and continue at a high rate until the battery has attained a substantially peak charge, and no longer, in order to avoid damage to the battery.

OBJECTS OF THE INVENTION

It is therefore the desideratum of the present invention to permit accurate and repeatable determination of the attainment of full charge of a battery under charge for correspondingly controlling the termination of applied electrical energy to the battery.

It is a particular object of the invention to provide methods of so controlling the termination of applied charging current to a battery based on dynamic monitoring of the voltage profile of the battery.

It is another object of the present invention to provide such methods that permit charging of a battery at high charge rates and that are capable of accurately controlling termination of applied charge so as to avoid overcharging and damage to the battery.

It is a further object of the invention to provide such methods that may be implemented using reasonable amounts of processing power and data storage for implementation without undue expense from readily available components.

Still another object of the present invention is to provide a method for avoiding premature termination of applied charge to a battery due to the presence of a high impedance spike when charging energy is initially applied to the battery.

It is a yet further object of the invention to provide such a method for avoiding premature termination of applied charge that is reliably effective substantially independent of the rate of applied charge to a battery.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several views.

DETAILED DESCRIPTION OF THE PREFERRED EMBODIMENTS

The present invention is broadly directed to a method and apparatus for charging a rechargeable battery and, more particularly, to a method and apparatus for controlling the rapid and efficient charging of such a battery and then terminating the application of charge when the battery has been fully charged. The term fully charged is intended to connote that condition of a battery in which the further application of electrical energy does not result in an appreciable increase in the amount of charge that the battery is holding. In accordance with the invention, the appropriate charge termination point is dynamically determined by monitoring a characteristic parameter of the battery and controlling the application of charge in response to changes in that parameter so as to avoid unintended overcharging of the battery. In a most preferred form of the invention, the monitored characteristic is the no load voltage of the battery under charge.

Figure 1:
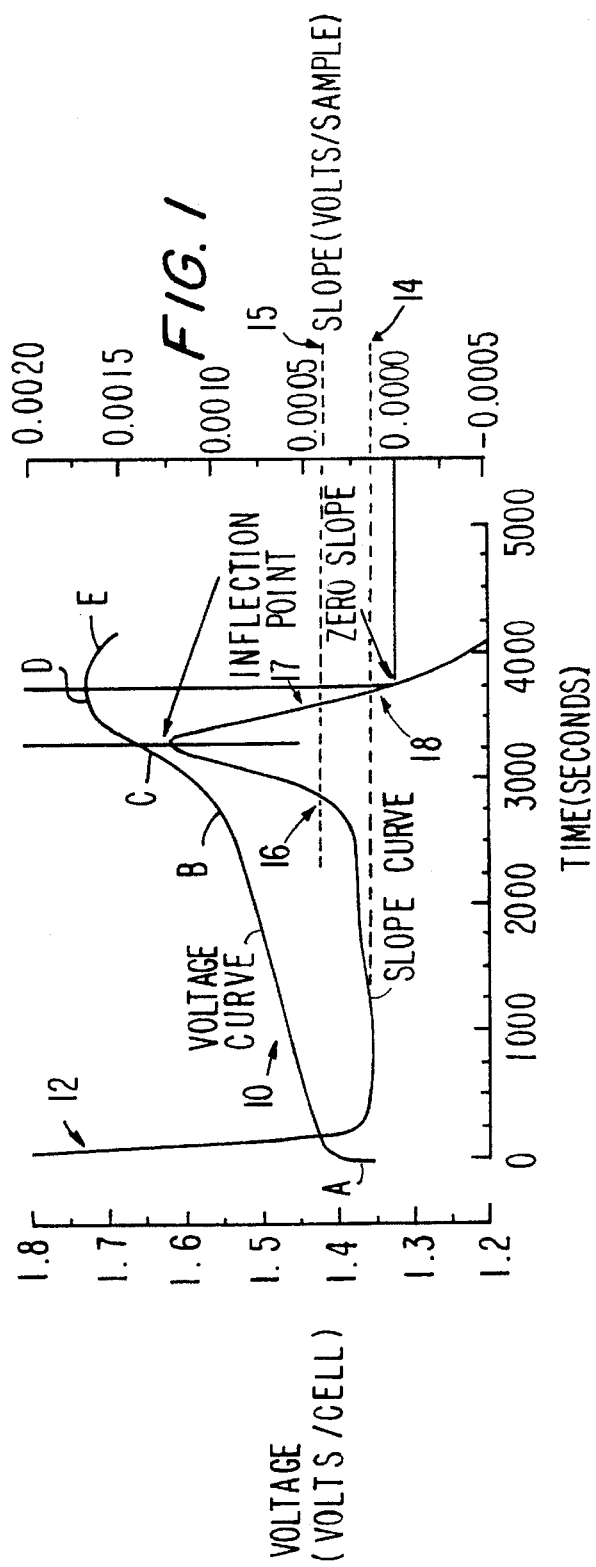
FIG. 1 is a graph depicting typical voltage and voltage slope curves, as a function of time, for a rechargeable nickel-cadmium battery under a constant current charge.

The invention is particularly intended for use in the charging of nickel-cadmium and/or nickel-metal hydride batteries, although its application to other battery types and chemistries exhibiting similar or equivalent or analogous parameter characteristics is also contemplated and intended. Such batteries are typically comprised of a plurality of individual cells arranged in a serial and/or parallel relationship although, for purposes of this disclosure, the terms battery and cell are sometimes used interchangeably. Also for convenience, rather than by way of limitation, the invention is herein described with specific reference to nickel-cadmium cells, it being understood that its corresponding use with other suitable battery types will be apparent to those of ordinary skill in the art having knowledge of this disclosure. In any event, as such batteries accept an applied charge, as through the application of a relatively constant current, their electrochemical potential or voltage exhibits a nonlinear change, with time, having a predetermined characteristic form. FIG. 1 illustrates a typical voltage characteristic or curve 10 of a nickel-cadmium battery being charged at a 1C rate by a substantially constant current.

As seen in FIG. 1, as the battery accepts a constant amplitude current charge, its voltage characteristic or profile 10 proceeds through four distinct phases. In the first phase "A" corresponding to the initial application of electrical energy to a substantially fully discharged battery, the voltage profile is relatively steep since the initial impedance of the battery is high. The second phase "B", typified by the shallowest voltage curves and extending for the lengthiest portion of the charging profile, corresponds to the period of primary electrochemical conversion of the applied electrical energy to chemical energy. Region "C", in which the voltage rapidly increases due to a sharp increase in the battery impedance, follows. This rapid increase in voltage results from the increasing difficulty in locating uncharged active material in the battery to convert to charged material, since by this point most of the active material in the battery has been charged.

At the point "D" between the third region "C" and the final region "E", the battery voltage reaches a peak conventionally identified as the point of maximum charge at which there remains substantially no uncharged active material to convert. Beyond that peak—i.e. the region "E" which is recognized as representing the transition from charging to overcharging of the battery—the cell impedance begins to drop, as does the battery voltage. Continued application of electrical energy to the battery after attaining the voltage peak "D" results in rapid and excessive heating and the production of gases that will eventually cause irreversible damage to the battery and/or the charger.

As herein disclosed, the charging of a battery is effected by the application of a substantially constant current while monitoring the characteristically-varying battery voltage. In a most preferred form of the invention, current is applied to the battery in a continuously repeating, cyclic charge sequence consisting of a positive current charging pulse followed by a negative high current, short duration discharge pulse and, finally, a data acquisition period during which no charge is applied to the cell. This technique, heretofore known in the art, notably increases the charging efficiency and effectively obviates the so-called memory effect—in which there is a loss of charge capacity when a cell is only partially discharged between repeated charges—to which nickel-cadmium and like batteries are prone. Thus, references contained herein to the use of a constant or substantially constant current, or alternatively to a substantially constant voltage, for charging a battery may denote a substantially constant amplitude of the charging pulse or, more broadly, that whenever electrical energy is applied to the battery for increasing the stored charge, the energy applied is maintained at a substantially nonvarying amplitude. It should also be understood that, where charging is effected using an alternating series of charge and discharge pulses, as is preferred, the amplitude of the charge pulse may alternatively vary within any given charge pulse so long as the total amount or quantum of energy applied to the battery during that pulse is the same from one charge pulse to the next.

Figure 2:
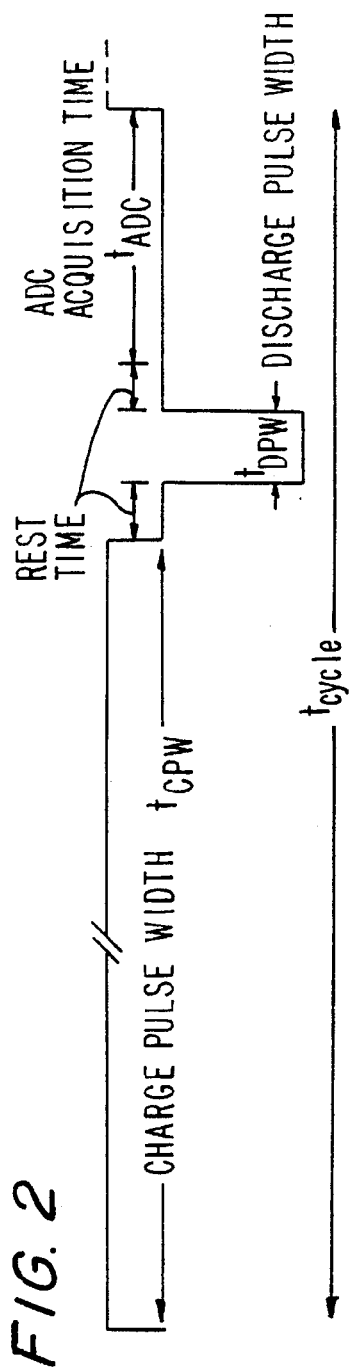
FIG. 2 is a graphical representation of a preferred charge cycle by which charging current is applied to a battery under charge in accordance with the present invention.

By way of preferred example and not limitation, and as illustrated in FIG. 2, each cycle has a period $t_{cycle}$ of approximately one second consisting of a positive charge pulse width $t_{CPW}$ of approximately 1048 ms, a negative discharge pulse width $t_{DPW}$ of approximately 5 ms, a data acquisition period $t_{ADC}$ of approximately 16 ms, and brief rest or settling periods of approximately 4 ms immediately following the charge and discharge pulses. To permit user-selected or otherwise appropriate variations in the absolute times defined for each of the periods $t_{CPW}$, $t_{DPW}$ and $t_{ADC}$, the periods may be restated as preferred fractions of the full cycle time $t_{cycle}$—i.e. a positive charge pulse width $t_{CPW}$ of approximately $0.98 \cdot t_{cycle}$, a negative discharge pulse width $t_{DPW}$ of approximately $0.015 \cdot t_{cycle}$, a data acquisition period of approximately $0.005 \cdot t_{cycle}$, and rest or settling periods of approximately $0.005 \cdot t_{cycle}$. The discharge pulse has a preferred amplitude of approximately −2.5 times the charge pulse amplitude. The battery voltage is measured during the data acquisition period $t_{ADC}$ and, since no current is flowing during that period, the measured voltage provides a substantially noise-free and reliable representation of the true state of charge of the battery. It is generally contemplated that the measured analog voltage be digitized in an analog-to-digital ("A/D") converter of any suitable form for processing as hereinafter disclosed.

Briefly described, the inventive method dynamically monitors the voltage of the battery under a constant current charge, periodically calculates the first derivative or slope of the measured voltage profile with time, and utilizes the resulting slope profile to dynamically track the relative charge status of the battery and to determine the proper time at which to discontinue charging at the substantially constant current being applied. Because the first derivative of a parameter will exhibit minima and maxima in advance of like peaks occurring in the parameter itself, use in the invention of the first derivative or slope of the measured voltage with time, rather than the measured voltage itself, to control charging of the battery permits early and accurate prediction of the most suitable point at which to discontinue the application of full charge to a battery. It is also known that, for the types of rechargeable cells to which the present invention is primarily directed, the voltage slope exhibits a characteristic, time-varying profile that initially decreases as a function of time to a bottom peak, then rises to a top peak, and finally once more decreases from the top peak. The slope profile resulting from the typical voltage characteristic 10 of FIG. 1 is also illustrated in that figure and identified there by the general reference numeral 12. The present invention operatively identifies the minimum slope that occurs in the bottom peak (indicated by the dotted line 14 in FIG. 1) of the slope profile, dynamically calculates a suitable trigger threshold slope value 15 (FIG. 1) that exceeds the so-identified minimum by a predetermined amount, awaits and identifies a first 16 and, optionally, then a second 17, passage of the slope profile through that threshold, and then terminates charging at a predetermined point in the slope curve beyond the trigger threshold as the slope profile decreases from its top peak.

Figure 3A:
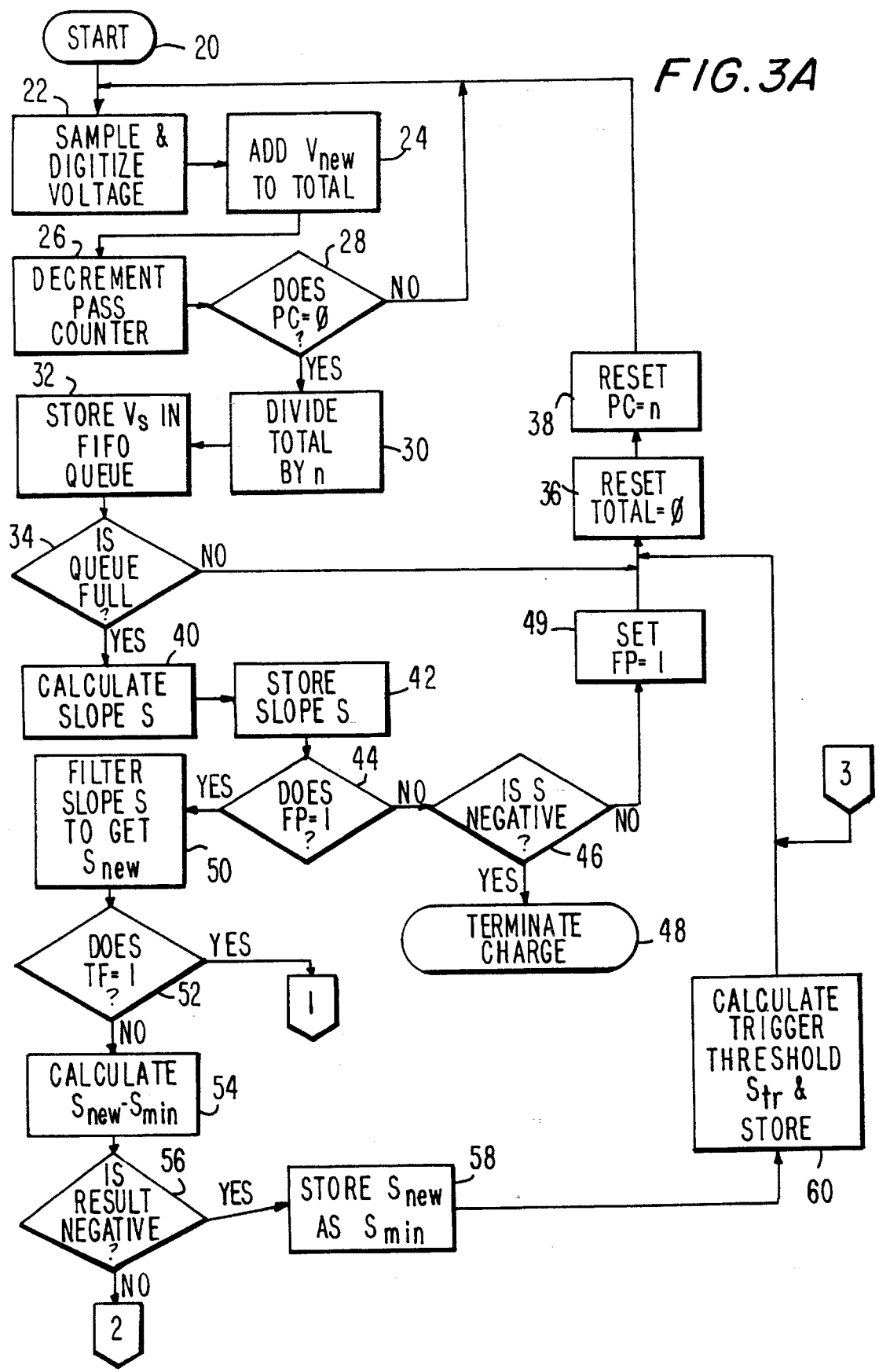
FIGS. 3A, 3B and 3C together comprise a flow chart depicting the sequence of processing steps performed in a first preferred method of controlling the application and termination of charge to a battery in accordance with the present invention.
Figure 3B:
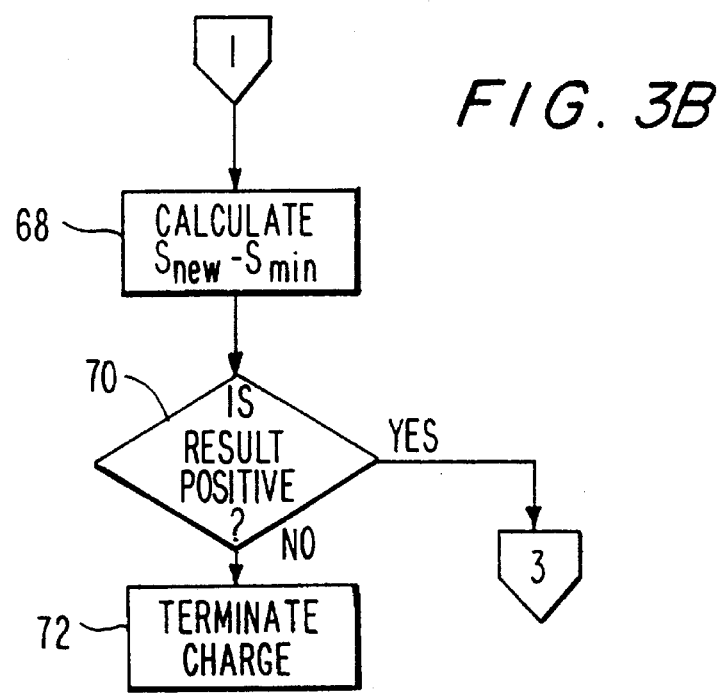
Figure 3C:
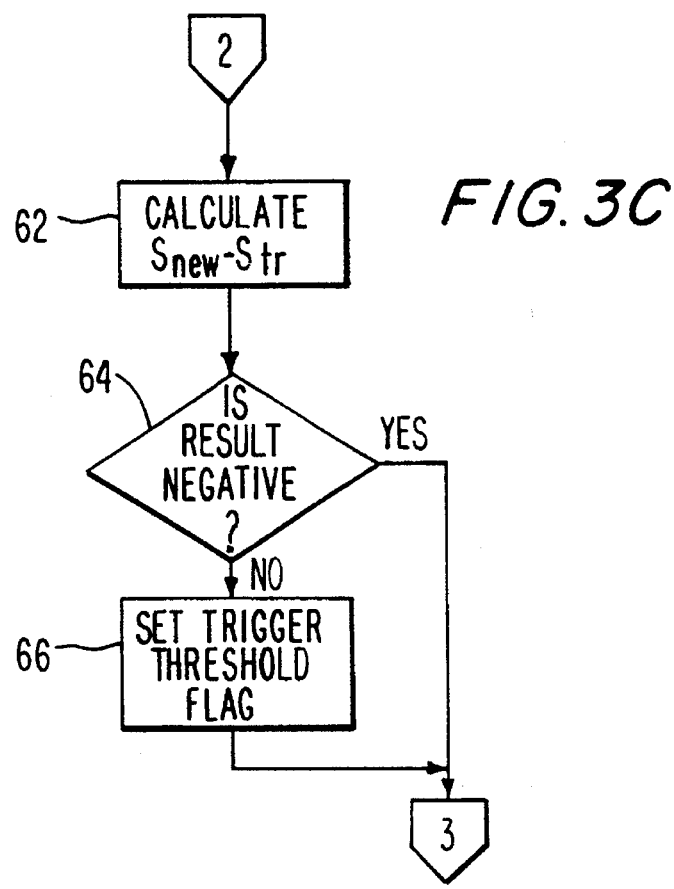

A flow chart depicting a currently-preferred method of controlling the charging of a battery in accordance with the present invention is shown in FIGS. 3A, 3B and 3C. It is generally contemplated and intended that the operations represented by the flow chart most preferably be performed by a programmable microprocessor or otherwise dedicated controller programmed to intelligently sequence through a series of operating steps, although those skilled in the pertinent arts will recognize that suitable apparatus for carrying out the inventive method may alternatively be implemented utilizing interconnected integrated circuits and/or discrete components of conventional form and ready availability. It is in any event understood that the flow chart of FIGS. 3A, 3B and 3C is of sufficient detail, particularly when considered in conjunction with this accompanying description, to enable an experienced programmer to implement the inventive operating steps in a standard, general purpose microcomputer or processor or the like and/or to enable its implementation in functionally equivalent or otherwise suitable discrete components or other hardware or apparatus and/or software-based embodiments.

The start block 20 of FIG. 3A signifies the beginning of the inventive process at which time the various registers, counters, storage buffers, latches and flags of or associated with the processor are reset and initialized in preparation for the charging of a battery. These initializations include setting a first-pass flag or variable FP to zero, a trigger threshold flag TF to zero, a variable TOTAL to zero, and a pass counter variable PC to n, and storing an initial minimum slope value $S_{min}$ that at least minimally—and preferably significantly—exceeds any calculated slope value expected in the practice of the inventive method. At this point, a charging current of predetermined amplitude is applied to the battery and, although a repetitively cyclic implementation of applied current such as depicted in FIG. 2 is preferred, the inventive method may also be employed with a more conventional, non-cyclic current source lacking periodic discharge pulses and/or noncharging data acquisition periods and noninterruptedly applying a fixed or nonvarying electrical current to the battery under charge.

It should at this juncture be pointed out that the invention may be applied with equal benefit and utility to the charging of batteries at a wide range of charge rates, such for example from a 4C rate (yielding a full charge in approximately 15 minutes) for providing a particularly rapid charge to previously used or conditioned cells, to a relatively slow C/4 rate (fully charging a cell in approximately four hours) for new cells or for those requiring significant reconditioning. Thus, the selection of a particular charge rate is substantially a matter of intended utility and design choice. Employing the preferred repetitive cyclic charge current sequence of FIG. 2, a charge current pulse is applied—and an analog voltage reading or sample is taken and digitized—approximately once each second irrespective of the rate of charge; the variable aspect of the applied current source for any particular selected charge rate is merely the predeterminately fixed or constant amplitude of the charge current (and discharge current) pulses in the FIG. 2 cycle. A battery requiring a 4 amp charge pulse at a 4C rate, therefore, is charged with 1 amp charge pulses at a 1C rate. Preferred or appropriate changes to and variations in the operating steps of the present invention for accommodating user selection of different charge rates will be described as this disclosure proceeds.

Those skilled in the battery arts will recognize that the voltage curve 10 and, correspondingly, the slope profile 12 resulting therefrom, such as depicted in FIG. 1 are somewhat idealized in that the relative length and height and rate of change and other aspects of these curves will vary somewhat as a function of battery chemistry and of the type and history of use and condition and the like of a given battery. Moreover, in practice the periodically sampled or measured voltage curve 10 will exhibit numerous fluctuations and perturbations from the relatively smooth profile that is illustrated in FIG. 1 as a result, inter alia, of the process of electrochemical conversion of energy, of electrical noise or interference, and of the available bandwidth or processing power or resolution of the functional elements or components, such as the A/D converter(s), employed. To minimize the effects of such fluctuations and perturbations and thus enhance the ability to reliably utilize as herein disclosed the measured and calculated data that defines the resulting slope profile, the invention—in its most preferred form—predeterminately averages and weights the voltage measurement samples and slope calculations as hereinafter described.

With continued reference to FIG. 3A, therefore, after charging current is applied to the battery the analog voltage is sampled and digitized, as indicated at block 22, approximately once each second—preferably during the data acquisition period $t_{ADC}$ of each cycle of applied charge current. To reduce the effects of sample-to-sample perturbations, the inventive method averages a successive number n of consecutive samples. At a 4C charge rate, each 2 consecutive samples are averaged, whereas at a 2C charge rate 4 consecutive samples are averaged and, at a charge rate of 1C, 8 consecutive voltage samples are averaged; determination of the appropriate number of samples averaged for lesser, or other, charge rates will be apparent or, in any event, may be extrapolated or otherwise suitably assigned by those skilled in the art. This preferred relationship between the number n of consecutive voltage samples that are averaged for any particular rate of battery charge has the advantageous effect of scaling the resulting voltage (and voltage slope) profiles to maintain predetermined magnitudes of such profiles and thereby facilitate the calculation of the trigger threshold, as hereinafter disclosed for the currently most preferred embodiments of the invention, without regard to the rate of charge. Thus, at block 24 the most recent digitized voltage sample $V_{new}$ is added to the summed voltage sample(s) currently stored ("TOTAL"), and the pass counter—which is initially set to count either up to or down from n—is respectively incremented or decremented (block 26). Assuming the latter, at block 28 the pass counter variable PC is tested to determine whether it equals zero; if not, the next voltage sample is taken at 22 and, if it does, then the stored TOTAL is divided by n (block 30) to obtain an averaged voltage sample $V_s$. The sample $V_s$ is then stored in the last or entry position in a first-in-first-out (FIFO) holding queue or storage buffer for retaining a predetermined plurality of samples—in the currently preferred embodiment the queue holds 17 such samples—and the data in the queue is advanced or shifted forward therewithin (block 32). At block 34, the queue is tested to determine if all of its storage locations contain data. If not, then the variable TOTAL is reset or cleared to zero (block 36), the pass counter variable PC is reset to n (block 38), and the next battery voltage measurement is taken and digitized at block 22.

If on the other hand the result of the interrogation at block 34 is positive, indicating that the queue is full, then a calculation of the current slope $S_{new}$ of the measured voltage profile is carried out (block 40) using the plural queue-stored voltage samples $V_s$. In the preferred form of the invention, the slope S is calculated using a standard linear regression algorithm to smooth and enhance the resulting slope profile, such for example as the formula:

$$S = \frac{s\Sigma iV_i - \Sigma i\Sigma V_i}{s\Sigma ii - \Sigma i\Sigma i}$$

where s denotes the number of stored voltage samples $V_s$ in the queue (i.e. 17 in the preferred embodiment), and $V_i$ is the voltage sample $V_s$ stored at position or location i in the queue. The so-calculated slope S is then stored at block 42.

The state of the first-pass variable FP—which is initially set to 0 (at START block 20) to denote the first time that the queue is being filled with digitized voltage samples $V_s$, and is subsequently set to 1 after the queue has been completely filled for the first time—is next tested at block 44. If the variable FP equals 0, yielding a negative response to the block 40 interrogation, the sign of the slope S just calculated (block 40) and stored (block 42) is tested, at block 46, to determine whether that slope is negative. A positive response, indicating that the calculated slope S is negative, means that the battery voltage is decreasing and, accordingly, that the battery is already fully charged—or, at the very least, that it is not accepting charge. In that event, the application for charging current to the battery is terminated, as represented at block 48. If, on the other hand, testing of the calculated slope S determines that it is not negative, the first pass variable FP is set to 1 (block 49), the variables TOTAL and PC are reset to zero and n, respectively (blocks 36 and 38), and the processing sequence returns to block 22 at which the next voltage measurement is taken and digitized.

A "yes" response to the block 44 inquiry, indicating that this is not the first filling of the queue, passes processing to block 50. At block 50, the slope S calculated at block 40 is filtered to further smooth the resulting slope profile and provide a filtered or effective slope value $S_{new}$. In the currently preferred embodiment of the invention, this filtering is digitally effected using a software-implemented 7:8 infinite impulse response filter in which the immediately-preceding slope value $S_{new}$ is weighted seven times more heavily than the most recent calculated slope value S. Thus, the slope S calculated at block 40 is added to the product of seven times the stored prior value $S_{new}$, and the resulting sum is divided by eight to define the latest $S_{new}$. Of course, other impulse filtering algorithms utilizing different weightings and/or numbers of successive data values, and/or other data filtering or smoothing arrangements, implemented in hardware and/or software, may alternatively be employed as general matters of design choice. As should also be apparent, the filtering operation at block 50 is omitted or skipped if no prior value of $S_{new}$ has been stored—which will obviously be the case for the first pass through the slope calculation steps of block 40.

Next, at block 52, the condition of the trigger threshold flag TF is tested to determine whether it has previously been set. A negative response indicates that the slope profile, in its ascension from the bottom peak to the top peak, has not yet reached or passed through the trigger threshold. In that case, the currently-stored minimum slope value $S_{min}$ is subtracted from the latest or current filtered slope value $S_{new}$ (block 54) and the result is tested at block 56 to determine whether that difference is less than zero. A positive response to the block 56 interrogation—indicating that the newly-calculated and filtered slope $S_{new}$ is of lesser magnitude than the currently-stored minimum slope $S_{min}$ or, put another way, that the slope profile is still decreasing in the area of the bottom peak—causes $S_{new}$ to be stored as the new or replacement value of $S_{min}$ (block 58). A trigger threshold slope value $S_{tr}$ is then calculated and stored (block 60) on the basis of the newly-identified $S_{min}$, following which the variables TOTAL and n are reinitialized (blocks 36, 38) and the next battery voltage reading is taken and digitized (block 22).

Calculation of the trigger threshold slope or value $S_{tr}$ is thus carried out in dynamic response to each identification of a new or updated value of the minimum slope $S_{min}$. The purpose of this threshold is to enable the inventive method to reliably confirm that the battery has accepted a substantially full charge by the point at which the application of charging current is terminated. More particularly, the threshold provides a trigger point located at a suitable position between the bottom peak and top peak of the slope profile 12 (FIG. 1) and through which the calculated slope value must pass as it progresses upwardly from the identification of the minimum slope at the bottom peak, to the top peak, and then downwardly again to the termination point at which the method controlledly discontinues full charging of the battery. By so detecting when the calculated slope $S_{new}$ passes through the trigger threshold $S_{tr}$ following identification of the minimum slope, the inventive method may be "armed" to thereafter await and respond to the subsequent point at which the slope equals or attains the charge termination value. With appropriate selection of the threshold, this process is effective to avoid a false or unintended early termination in the supply of charge current should unexpected perturbations in the calculated slope cause its value to equal or become less than the termination slope value in or proximate, by way of example, the region of the bottom peak of the slope profile.

In accordance with a most preferred embodiment of the invention, the trigger threshold value is determined by adding a numeric quantity to the dynamically-identified minimum threshold $S_{tr}$. The resulting trigger threshold may be calculated by adding to the minimum slope a non-zero fraction of the difference between the minimum threshold and the expected or estimated top peak of the slope profile, and should be numerically larger than the intended termination slope value. That fraction is preferably less than approximately one-half of that difference, and most preferably approximately one-seventh to one-fifth of that difference, amounts sufficient to assure that the slope profile has at least begun to proceed upwardly from the bottom peak toward the top peak. It should be noted, in selecting a suitable value or position for the trigger threshold between the minimum threshold and top peak, that a lower threshold will provide effective results when using a higher resolution D/A converter (by which the measured analog voltage is digitized), whereas a lower resolution D/A converter will require a higher threshold to assure sufficient reliability in avoiding false or premature determinations that the trigger threshold has been attained.

In the most preferred method herein disclosed, the trigger value that is added to the minimum threshold to dynamically define the trigger threshold is a predetermined or preprogrammed numeric quantity. In that embodiment, the trigger value has been defined by developing an empirical estimate of the nominal peak slope expected at a 1C charge rate as represented by the curves of FIG. 1; the scaling achieved by averaging the different number of voltage measurements taken at different charge rates (as implemented at blocks 22, 24, 26, 28, 30) permits use of the same, preset trigger value irrespective of the battery charge rate employed. The trigger value is preset in that embodiment to approximately one-fifth of that empirical estimate or, utilizing the voltage and slope magnitudes indicated in FIG. 1, approximately 0.00025. This particular value assumes a D/A converter of 13-bit resolution and, in any event, represents but one exemplary implementation of the inventive methodology.

Those skilled in the art will additionally recognize that various other alternate methodologies may be employed to define the trigger value to be added to the minimum slope, or to otherwise provide a suitable trigger threshold in accordance with the present invention. Since the precise location or value of the trigger threshold is, within the conceptual bounds of its intended utility, primarily a matter of design choice and convenience of implementation, all such modifications should be understood as being within the anticipated scope and contemplation of the invention. It is generally intended and preferred, however, that the trigger threshold be based on and dynamically calculated in accordance with the minimum slope identified in the process and operation of the invention.

Returning now to block 56 of the flow chart of FIG. 3A, where the result of that interrogation is negative—denoting that the newly-calculated slope value $S_{new}$ is greater than or equal to the stored minimum slope $S_{min}$ and, thus, that the slope is proceeding along the profile 12 (FIG. 1) from the bottom peak toward the top peak of the profile—the processing sequence branches to the subroutine of FIG. 3C and, more particularly, to the calculation of block 62. There, the stored trigger threshold $S_{tr}$ is subtracted from the current slope value $S_{new}$, and the result is then tested at block 64. A positive answer to the question "is the result negative?" indicates that the slope profile has not yet reached or equalled the trigger threshold, whereupon the variables TOTAL and n are reset (blocks 36, 38), and the next voltage measurement is taken and digitized (block 22). If the answer to the block 64 inquiry is negative, on the other hand, the trigger threshold flag TF is set, e.g. to 1 (block 66), and the operating sequence returns to blocks 36 and 38 to reset the variables TOTAL and n and then to block 22 to take and digitize the next battery voltage measurement.

It will be recalled that, after the current effective slope value $S_{new}$ is provided at block 50, the status of the trigger threshold flag TF is tested at block 52. When that interrogation indicates that TF equals 1—i.e. that the trigger threshold has been attained and the flag has been set—processing passes to the subroutine of FIG. 3B. In that subroutine, the stored minimum slope $S_{min}$ is subtracted from the current slope value $S_{new}$ (block 68). The result is then tested at block 70, which asks whether the result is positive. Since this first preferred embodiment is intended to discontinue the application of full charging current to the battery when the slope, after passing the first threshold, returns to the previously-identified minimum slope $S_{min}$, if the result of the inquiry at block 70 is negative—indicating that the minimum slope has been reached—then the application of charging current to the battery is terminated at step 72. Where the result at block 70 is positive, on the other hand, the variables TOTAL and n are reset (blocks 36, 38) and the processing sequence once more returns to take and digitize the next battery voltage measurement at block 22.

Thus, briefly described, this first preferred embodiment of the present invention operates as follows. As charge current is applied to the battery, the voltage is periodically measured and the slope of the voltage characteristic is calculated. The minimum slope of the bottom peak of the slope profile is identified and, as appropriate, updated and stored. With each identification and update of the minimum slope, a trigger threshold between the minimum slope and top peak is defined, and then stored, by adding a trigger value to the minimum slope. When the calculated slope, increasing from the bottom peak, reaches the trigger threshold, the method is armed—as by setting a trigger threshold flag—so that, when the calculated slope thereafter equals the minimum threshold, full-current charging of the battery is terminated. Automatic termination of full-current charging prior to the transition to overcharging of the battery is thereby assured.

It should also be understood that references herein to termination of the application of charge to the battery (as for example at the block 72 in FIG. 3B) are intended to denote the point at which the full charging current—i.e. that sustained magnitude or cyclically-repeated quantum of electrical energy which is substantially continuously applied to the battery throughout the entirety, or virtually the entirety, of the process of charging a battery at a particular rate in accordance with the invention—is no longer supplied to the rechargeable cell(s). This may denote the total cessation of the application of energy to the battery or, alternatively (and more typically), simply a reduction in the applied current or energy so that charging may thereafter continue at a predeterminately reduced rate to "top off" the charge or to merely offset the natural self-discharge rate of certain types of cells and thereby maintain a condition of full charge for a battery that thereafter remains connected to the charging device.

Figure 3D:
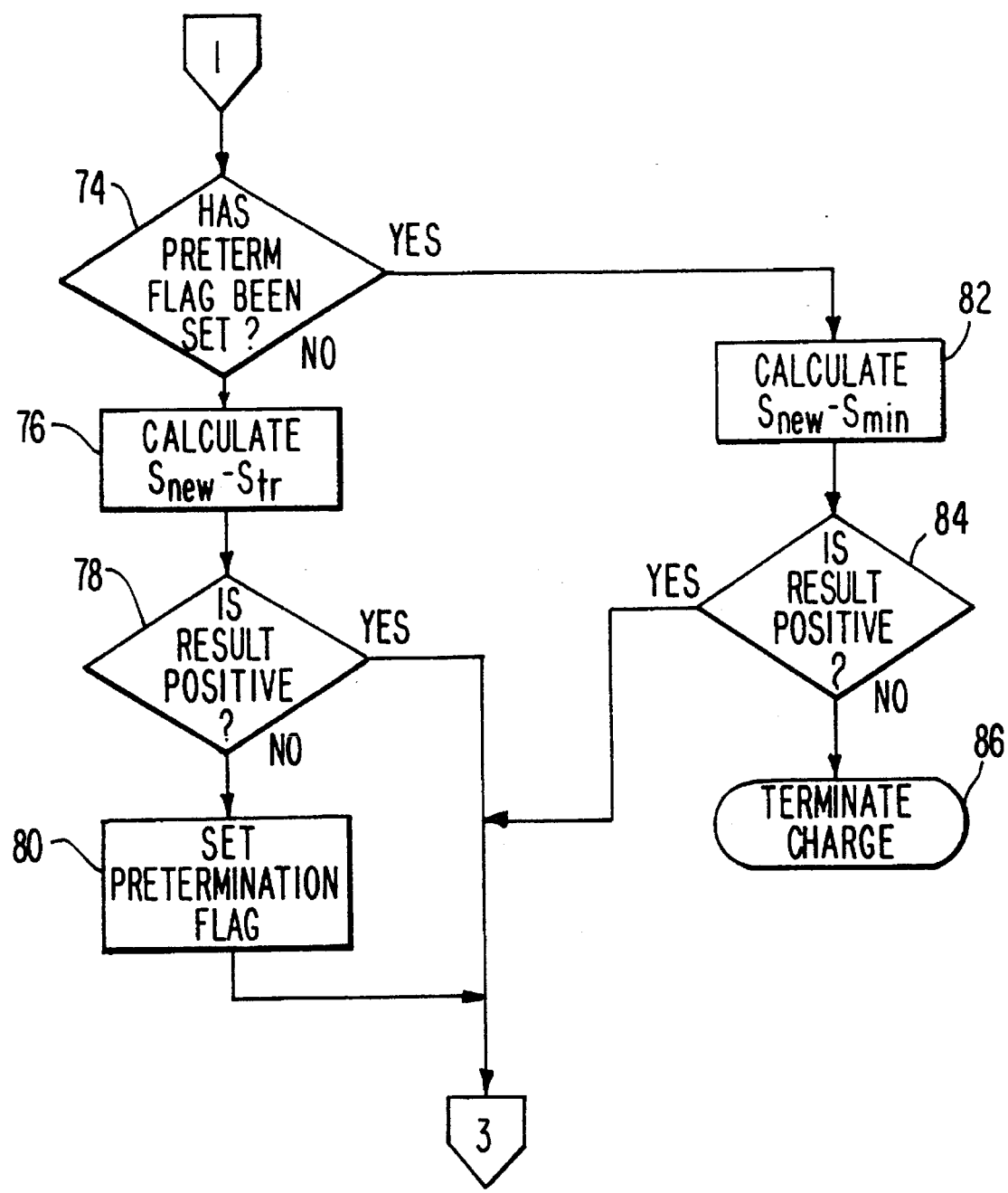
FIG. 3D is a flow chart depicting, in conjunction with FIGS. 3A and 3B, the sequence of processing steps performed in a modified second preferred method of controlling the application and termination of charge to a battery in accordance with the present invention.

In a somewhat modified and alternative embodiment of the present invention, the subroutine of FIG. 3B is replaced by the routine of FIG. 3D. In this second embodiment, both a first and a second passage of the slope profile through the trigger threshold $S_{tr}$ are identified. Termination of charging at the minimum slope $S_{min}$ occurs only after the calculated slope $S_{new}$ passes through the trigger threshold a second time—i.e. as the slope profile decreases following the top peak. The only alteration required to that portion of the processing sequence depicted in FIG. 3A for this second embodiment is the initialization or zeroing of an additional variable, namely a pretermination flag PTF, at START block 20.

Thus, when the response to the interrogation at block 52 (FIG. 3A) is positive—meaning that the trigger threshold flag TF has already been set and, correspondingly, that the slope has already passed the first occurrence of the trigger threshold as the profile increases from the bottom peak to the top peak—the program sequence passes to block 74 of the modified FIG. 3D subroutine. There, the status of the pretermination flag PTF is tested. If the flag has not yet been set, then the trigger threshold $S_{tr}$ is subtracted from the current calculated slope $S_{new}$ (block 76). The result is tested at block 78 to determine whether it is positive and, if so (indicating that the slope $S_{new}$ has not yet equalled the trigger threshold for a second time), the variables TOTAL and n are reset (blocks 36, 38) and the next voltage measurement is taken and digitized (block 22). Where the interrogation at block 78 results in a negative response, on the other hand, the pretermination flag PTF is set (block 80), as for example to 1. The variables TOTAL and n are then reset and the next voltage measurement is taken and digitized.

When the inquiry at block 74 reveals that the predetermination flag PTF has already been set, it must then be determined whether the termination point or threshold $S_{min}$ has been reached as the slope decreases from the trigger threshold. For this purpose, the minimum slope $S_{min}$ is subtracted from the current slope $S_{new}$ (block 82), and the result is tested at block 84. A positive response to the question of whether the result of the block 82 calculation is positive returns processing to blocks 36 and 38, where the variables TOTAL and n are reset, and then to block 22 at which the next voltage measurement is taken and digitized. A negative response at block 84, on the other hand, terminates the application of charging current to the battery (block 86) since that result denotes that the termination threshold $S_{min}$ has been reached.

Other modifications to these currently-preferred methods are also contemplated and deemed to be within the intended scope of the invention. By way of example, the above-described methods may be varied to substitute a new or different termination point or threshold for the above-disclosed use of the minimum slope $S_{min}$. In accordance with the invention, however, the termination threshold should be located in the range between the minimum slope $S_{min}$ and the top peak of the slope profile and, preferably, between the minimum slope and the trigger threshold $S_{tr}$. Most preferably, and so as to most reliably assure that termination not occur before the battery is substantially fully charged, the termination threshold should be set or located closely proximate, or at least relatively proximate, the minimum slope $S_{min}$. The further above the minimum slope that termination occurs, the greater the likely need for the additional application of a reduced charging current to the battery to top off or peak the retained charge.

Where a termination threshold greater than, or at least different from, the minimum slope is to be employed, the same may be calculated concurrently with each new calculation of the trigger threshold TF, as at block 60 (FIG. 3A). This may be accomplished by defining the termination threshold as a non-zero fraction of the trigger threshold, or as a non-zero fraction of the preset or otherwise-determined trigger value that is then added to the minimum slope to provide the termination threshold, or in any other convenient manner as a general matter of design choice. It should nevertheless be understood that, in the most preferred forms of the invention that utilize a termination threshold different from the minimum slope $S_{min}$, the termination point will be computed or determined as a function of the minimum slope that is dynamically identified in accordance with the invention.

It should also be pointed out that the present invention includes within its intended scope and contemplates other variations in, by way of example, the manner and timing by which samples of the battery voltage are, as is generally preferred, periodically taken or sensed. The aforedescribed methods generally employ a process of sampling the battery voltage once every x seconds or fixed time intervals or units, and then averaging each n consecutive voltage samples to obtain an averaged or effective sample $V_s$. Those skilled in the art will recognize that although this process advantageously smoothes the so-measured voltage profile by minimizing the effect of localized perturbations, in the alternative a single battery voltage sample $V_s$ may be taken during each successive interval of x seconds or nx seconds or any desired or otherwise suitable duration, thereby eliminating the averaging of multiple samples. While the resulting voltage profile will be somewhat noisier than that achieved by the preferred averaging technique, this alternative approach lessens the required real-time processing power required and will amply support the implementation and effective use of the charge termination procedures of the present invention.

Figure 4:
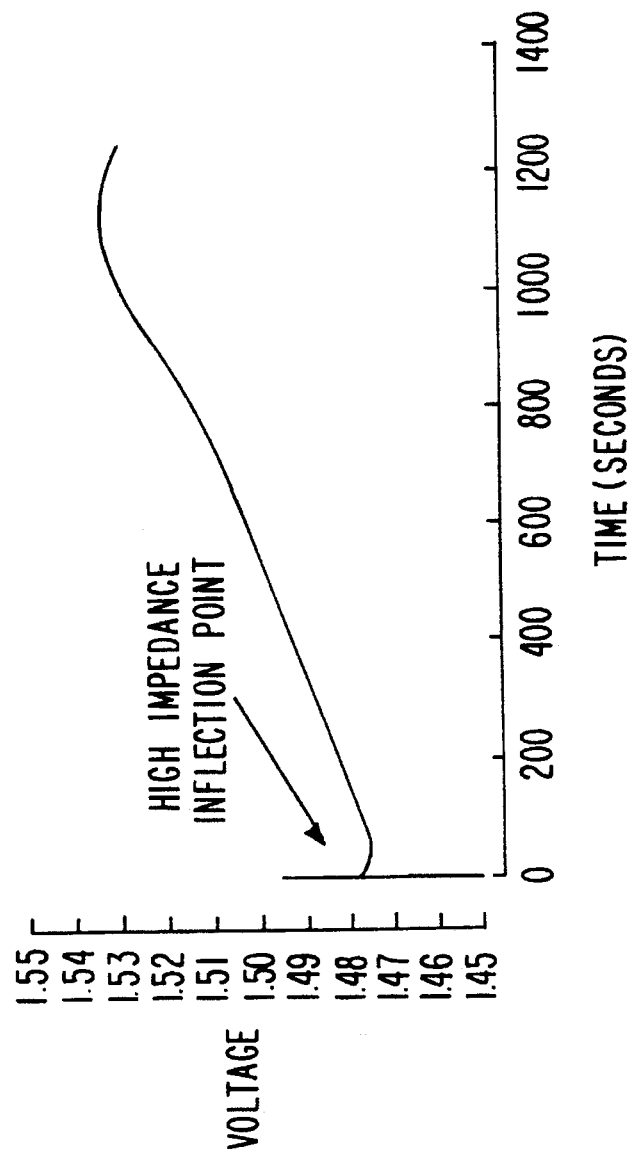
FIG. 4 is a graph depicting battery voltage as a function of time for a battery under charge and illustrating a high impedance inflection point occurring when charging energy is initially applied to the battery.
Figure 5:
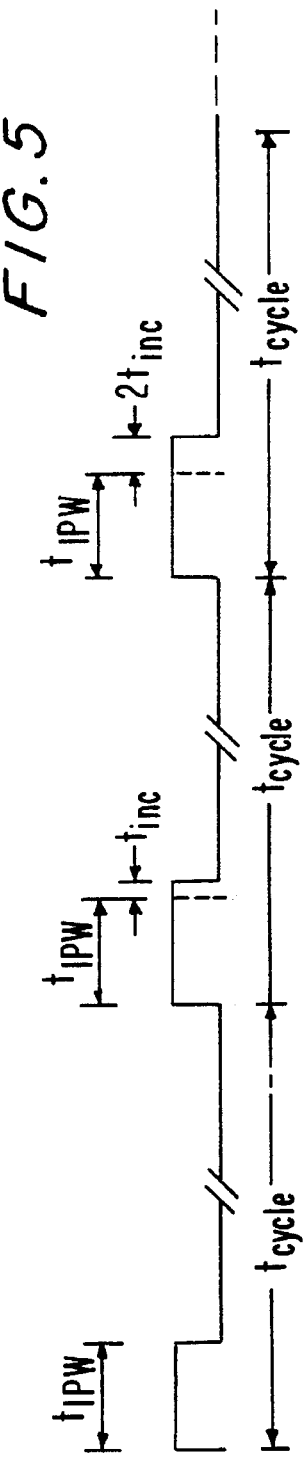
FIG. 5 graphically depicts a preferred method of gradually increasing the cyclically-applied charging current to a battery at the beginning of the battery charging process in accordance with the invention.

A further modification and optional addition to the various embodiments of the present invention hereinabove disclosed will now be described in conjunction with FIGS. 4 to 6. It has been observed that many of the newer prismatic and high capacity cells will at times exhibit a relatively brief high impedance condition in response to the initial application of a high charging current to the battery. As illustrated in FIG. 4, this high impedance causes the battery voltage to sharply rise, and to then rapidly fall, immediately after charging current is first applied, producing a spike-like or otherwise high-amplitude inflection point. When the charge termination methods of the present invention—as well as other known methods or apparatus which control the charging process by monitoring changes in the battery voltage and/or identifying inflection points in the voltage curve—are employed, this initial rapid change and resulting start-up inflection point in the battery voltage curve can be misinterpreted as a sign of a fully charged battery and thereby initiate a premature termination of applied charge.

One available procedure for avoiding such premature termination would be to delay the monitoring of battery voltage, and/or the calculation of slope, for a finite period sufficient to permit the battery impedance to stabilize and the initial voltage spike to pass. The duration of this initial rapid rise and fall in cell voltage, however, varies as a function of charge rate; thus, although generally lasting for approximately 100 to 110 seconds at typical rapid charge rates, for particularly low charge rates its duration may increase to as much as several hundred seconds. Ignoring or delaying the calculation of slope and thus continuing to apply a high current charge for such an extended period can permanently damage a battery that is already fully charged when current is first applied, so that simply ignoring the cell voltage for a period sufficient to permit the high impedance inflection point to pass provides an unsatisfactory solution.

It has also been observed that although the duration of the rapid rise and fall in battery voltage increases with decreasing charge rate, there is a corresponding decrease in the amplitude of the increase at lower rates of applied charge, such that its spike-like character more closely resembles a hill or hump. Indeed, the area under the initial spike or hump remains relatively constant irrespective of charge rate. Thus, at a 4C charge rate the initial voltage spike has a higher amplitude and a shorter duration than the shallower amplitude and longer duration hump produced at a 1C charge rate. The present invention takes advantage of this relationship to avoid premature termination of battery charging due to misinterpretation of the occurrence of such a start-up inflection point at the onset of applied charge.

In accordance with a preferred implementation of this additional aspect and feature of the invention, current is initially applied to the battery at a relatively low rate of charge and is then gradually increased, preferably linearly increased, until the charge rate equals the substantially constant rate at which it is intended to fully charge the battery. The initial rate or amplitude of charge is selected so as to apply to the battery a charge small enough to avoid damage to the cell in the event that the battery is already fully charged but, as is preferred, large enough to initiate the storage or replenishment of charge in the battery. In addition, the increase of applied current from the initial rate of charge to the final, substantially constant rate at which full charging of the battery is intended takes place over a period of at least sufficient duration to avoid premature termination through misinterpretation of the start-up inflection point. This gradual ramping-up of the applied charge—referred to herein as the "soft start" process—provides the additional advantages of improved charge efficiency and enhanced battery life.

In a currently most preferred embodiment of the soft start process, a charging current of approximately one-fifth the full charge rate is initially applied to the battery. This initial rate is sufficient to minimize the amplitude, relative to the duration, of the voltage hump—irrespective of the intended full charge rate—while assuring that sufficient current is applied to the battery to immediately initiate the electrochemical conversion of energy by which the battery is charged. The rate of applied charge is then linearly increased, over a period of approximately two minutes, to the full charge rate. No slope values are calculated during this two minute interval. The initially low, and then gradually increasing, rate at which charge is applied to the battery over the preferred two-minute interval defines an average applied current that effectively minimizes overcharging of, and consequent damage to, an already-charged battery before its charged condition can be detected and the application of charge terminated in accordance with the present invention.

It will be recalled that, in the most preferred embodiments of the invention, charging current is applied to the battery as a repeating series of alternating charge and discharge pulses, each charge cycle having a period $t_{cycle}$ and the charge pulse width or period $t_{CPW}$, in the preferred example described hereinabove, being approximately one second. Where the full charge current is applied as a continuous series of substantially fixed or constant amplitude pulses of width $t_{CPW}$—irrespective of whether discharge pulses are also alternately or otherwise periodically applied to the cells under charge—the inventive soft start process may advantageously be implemented by predeterminately varying the charge pulse width while maintaining the charge cycle period $t_{cycle}$ and the charge pulse amplitude substantially constant. Gradual extension of the charge pulse width provides a stable, reliable and accurately controllable manner of selectively increasing the amount of charge being applied to the battery from the initial to the intended final or full rate.

As previously noted, the currently-preferred initial charge pulse width $t_{IPW}$ of the current initially applied to the battery under charge is approximately one-fifth of the intended full rate pulse width $t_{CPW}$. Assuming by way of example a charge cycle period $t_{cycle}$ of approximately one second, the charge pulse width is then extended, for each ensuing charge cycle $t_{cycle}$, by approximately $t_{inc}$, defined by the relationship:

$$t_{inc} = \frac{t_{CPW} - t_{IPW}}{n_{sec}}$$

where $n_{sec}$ is the number of seconds in the soft start period. Thus, utilizing the preferred two-minute period to attain the full charge rate, a charge cycle $t_{cycle}$ of one second and an initial charge pulse width $t_{IPW}$ of one-fifth the full charge pulse width $t_{CPW}$, the incremental increase $t_{inc}$ in each charge cycle $t_{cycle}$ following application of the initial charge pulse will be $t_{CPW}/150$. At the end of the two-minute soft start interval, the charge being applied to the battery will have gradually and linearly increased to the intended full charge current, that current thereafter remaining substantially constant until the battery is fully charged. This may be seen in FIG. 5.

Figure 6:
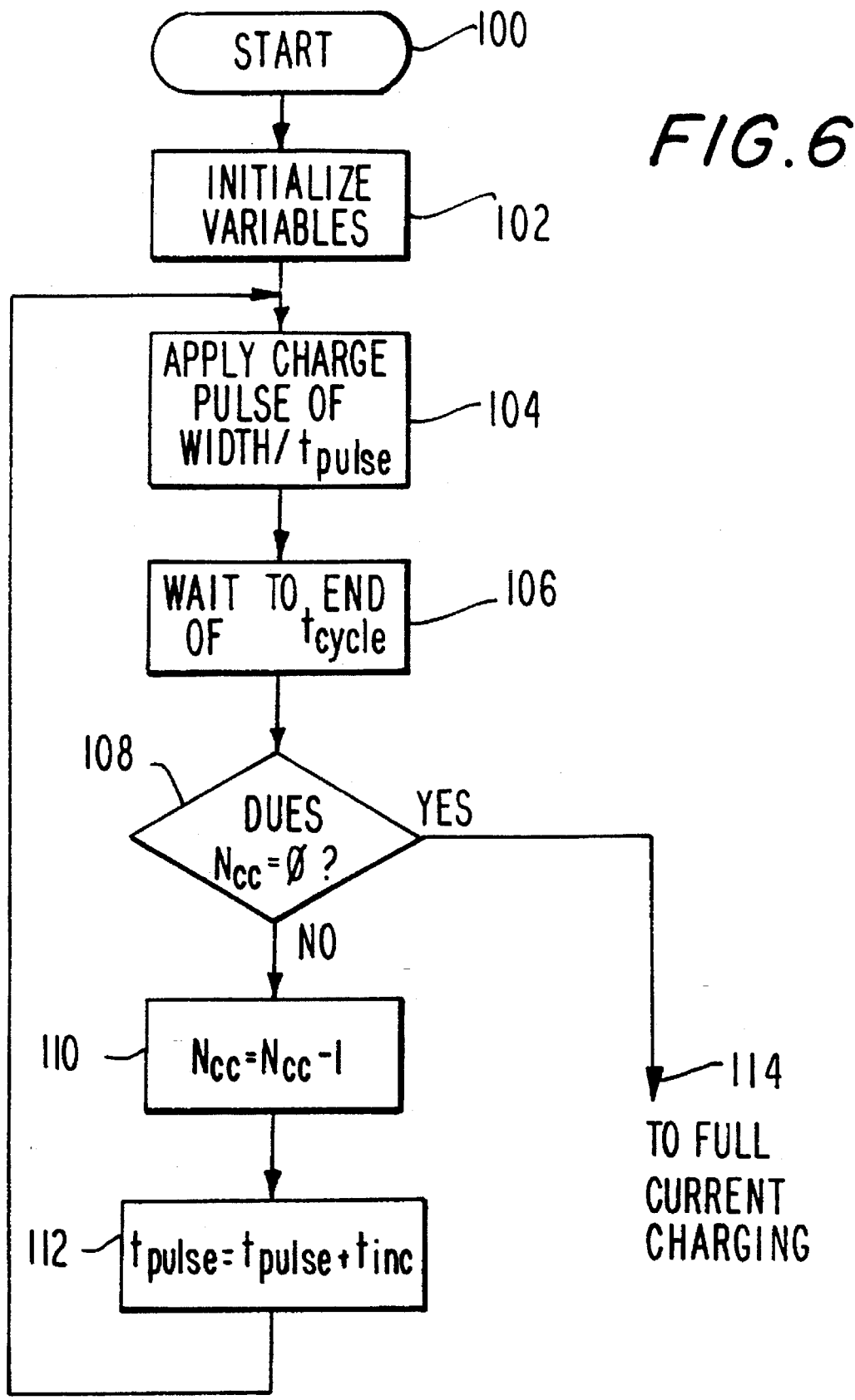
FIG. 6 is a flow chart depicting the sequence of processing steps performed in a so-called "soft start" method of initiating the charging of a battery in accordance with the present invention.

A flow chart depicting the soft start process is presented in FIG. 6. It is generally anticipated and intended that this process be carried out and controlled by a microprocessor or other controller operating on the basis of a series of predefined executable program steps or operations, although the use of discrete components and/or other hardware implementations are also contemplated.

For ease of description, the FIG. 6 flow chart assumes that the charging current is applied as a series of pulses of substantially constant amplitude and spaced apart so as to define a one second charge cycle period $t_{cycle}$, and that a two-minute soft start interval is employed. Those skilled in the art and having knowledge of this disclosure will nevertheless recognize the manner and ease with which the flow chart of FIG. 6 may be modified to accommodate variations of these parameters and/or other implementations or embodiments of the charge termination method of the present invention.

The "START" block 100 signifies the point following attachment of a battery to the charging apparatus at which the charge operation or sequence is to begin. The variables utilized in the soft start process are initialized at block 102; i.e. the applied charge pulse width variable $t_{pulse}$ is set to trow, and the variable $N_{cc}$ is initialized to the number of charge cycles—120 in this exemplary embodiment—defining the period during which the charge pulse width is increased from its initial width $t_{IPW}$ to its final or full width $t_{IPW}$.

In the first charge cycle, a charge pulse of width $t_{pulse}$, which at that point equals $t_{IPW}$, is applied to the battery as indicated at block 104. As previously noted, in the preferred embodiment of the invention—in which the duty cycle of the pulsed charge current is varied rather than the charge pulse amplitude—the initial charge pulse has the same amplitude as that of the pulses which are subsequently applied to the battery for charging the battery at the full rate intended or otherwise selected for use. Also within or during that first (and each succeeding) charge cycle, a discharge pulse may optionally be applied to the battery following the charge pulse and preceding the next-succeeding charge pulse of the following charge cycle. In either case, the remainder of the first charge cycle is then permitted to pass, as indicated at block 106. Although it is not necessary, for purposes of implementing the currently-preferred soft start and charge termination techniques of the present invention, that measurements of the battery voltage be taken during the soft start period as the applied charge is gradually increased, the battery voltage may be monitored during this period to detect, by way of example, removal or disconnection of the battery from the charging apparatus or a sudden and unanticipated high impedance condition that may indicate the need to immediately discontinue the supply of charging current to the battery.

At the end of the first charge cycle, processing advances to block 108, at which the status of the cycle count variable $N_{cc}$ is tested to determine whether charging of the battery has proceeded through the intended number of charge cycles defining the duration of the soft start process. If the variable $N_{cc}$ is not equal to zero, resulting in a negative response to the block 108 inquiry, then the variable $N_{cc}$ is decremented by one (block 110), the applied pulse width $t_{pulse}$ is extended by $t_{inc}$ (block 112) for the next cycle, and the processing sequence returns to block 104 at which the incrementally-increased charge pulse is applied to the battery. This process continues until, after repeatedly looping through the blocks 104 to 112 the number of times indicated during initialization of the variable $N_{cc}$ at block 102, the interrogation at block 108 results in a positive response and, as represented by block 114, normal full current charging of the battery then commences or continues. When utilizing the novel soft start process in conjunction with the inventive charge termination methods disclosed herein, further processing may proceed from block 114 of FIG. 5 to "START" block 20 of FIG. 3A.

A variety of modifications and variations to the afore-described soft start method should now be apparent to those skilled in the relevant arts. For example, the increase in the amount of charge being applied to the battery from the initial rate to the final or full rate, although heretofore described as being substantially linear, may alternatively be regularly or irregularly nonlinear as general matters of design choice. In addition, use of the soft start process in conjunction with battery charging and/or charge termination methods and apparatus other than those herein disclosed or otherwise implemented in accordance with the present invention—particularly other charge monitoring or termination procedures that employ or rely on the sensing of inflection points or other discernable changes in the voltage or current profile, or in the profiles of time derivatives thereof, of a battery under charge—is also contemplated. Moreover, although it is preferred that the relatively low initial charge rate be selected at least in part for its capability to initiate the electrochemical conversion to stored electrical energy and thereby impart charge to the battery, that rate may alternatively be at a level initially insufficient to thereby impart charge. Thus, the hereinabove-disclosed initial charge rate of one-fifth the full charge rate, although currently preferred, may be varied within the scope of the invention. The soft start method may also be employed whether a pulsatile or a continuous charging current is applied to the battery, and irrespective of whether, when utilizing a succession of charge pulses, the pulse width or the amplitude of the pulses—or some other characteristic—is varied to achieve the intended increase in applied charge.

Finally, although a two minute soft-start period for ramping-up of the charge rate is currently preferred, that period may be varied so as to be less than or greater than that particular duration. Indeed, the soft-start period may alternatively be defined as a non-zero fraction of the period that is required to fully charge the battery at the substantially constant full-current rate at which the battery is recharged and which extends from the conclusion of the soft-start interval to the termination of that charge rate when the voltage slope falls to or through the termination threshold. Thus, in order to accommodate battery charging at as high as a 4C rate—which is likely to be the substantially most-rapid rate of charge for practical use in accordance with the present invention—it is contemplated that the soft-start period or duration be no greater than approximately 15 percent of the time required to fully charge the battery at the full charge rate.

While there have been shown and described and pointed out fundamental novel features of the invention as applied to preferred embodiments thereof, it will be understood that various omissions and substitutions and changes in the form and details of the herein disclosed embodiments may be made by those skilled in the art without departing from the spirit of the invention. It is the intention, therefore, to be limited only as indicated by the scope of the claims appended hereto.

What is claimed is:

1. A method of charging a rechargeable battery having a voltage characteristic that varies in a predetermined manner with a charge state of the battery and for terminating said charging of the battery in response to the charge state of the battery when the battery has attained a full charge, comprising the steps of:

supplying electrical energy to the battery for charging of the battery;

monitoring said voltage characteristic of the battery as said electrical energy is supplied to the battery;

differentiating a variation of the monitored voltage characteristic with time as said electrical energy is supplied to the battery to provide a slope characteristic that decreases as a function of time to a bottom peak followed by a top peak followed by a decreasing slope;

identifying in said slope characteristic a minimum slope of said bottom peak as said electrical energy is supplied to the battery; and terminating said supplying of electrical energy to the battery when said slope characteristic equals said minimum slope as said slope characteristic decreases following said top peak.

2. A method of charging a rechargeable battery in accordance with claim 1, further comprising a step of identifying passage of said slope characteristic through a trigger threshold defined between said minimum slope and said top peak, and wherein said terminating step further comprises terminating said supplying of electrical energy to the battery after said identifying of the passage of said slope characteristic through said trigger threshold.

3. A method of charging a rechargeable battery in accordance with claim 2, further comprising a step of defining said trigger threshold by adding a predetermined trigger value to said minimum slope.

4. A method of charging a rechargeable battery in accordance with claim 1, further comprising a step of identifying passage of said slope characteristic through a trigger threshold defined between said minimum slope and said top peak as said slope characteristic increases from said bottom peak to said top peak, and wherein said terminating step further comprises terminating said supplying of electrical energy to the battery after said identifying of the passage of said slope characteristic through said trigger threshold.

5. A method of charging a rechargeable battery in accordance with claim 4, further comprising a step of defining said trigger threshold by adding a predetermined trigger value to said minimum slope.

6. A method of charging a rechargeable battery in accordance with claim 5, wherein said trigger value is less than one-half of a difference between said minimum slope and the top peak of said slope characteristic.

7. A method of charging a rechargeable battery in accordance with claim 1, further comprising a step of identifying passage of said slope characteristic through a trigger threshold defined between said minimum slope and said top peak as said slope characteristic decreases following said top peak, and wherein said terminating step further comprises terminating said supplying of electrical energy to the battery after said identifying of the passage of said slope characteristic through said trigger threshold.

8. A method of charging a rechargeable battery in accordance with claim 7, further comprising a step of defining said trigger threshold by adding a predetermined trigger value to said minimum slope.

9. A method of charging a rechargeable battery in accordance with claim 1, further comprising steps of:

identifying a first passage of said slope characteristic through a trigger threshold defined between said minimum slope and said top peak as said slope characteristic increases from said bottom peak to said top peak; and identifying a second passage of said slope characteristic through said trigger threshold following said first passage of said slope characteristic through said trigger threshold;

wherein said terminating step further comprises terminating said supplying of electrical energy to the battery after said identifying of said second passage of the slope characteristic through said trigger threshold.

10. A method of charging a rechargeable battery in accordance with claim 9, further comprising a step of defining said trigger threshold by adding a predetermined trigger value to said minimum slope.

11. A method of charging a rechargeable battery in accordance with claim 1, wherein said monitoring step comprises periodically measuring said voltage characteristic of the battery as said electrical energy is supplied to the battery.

12. A method of charging a rechargeable battery in accordance with claim 1, wherein said supplying step comprises supplying a substantially constant current to the battery for charging of the battery.

13. A method of charging a rechargeable battery in accordance with claim 12, wherein said supplying step further comprises a periodically repeating cycle consisting of a substantially constant amplitude charging pulse, a substantially constant amplitude discharge pulse, and a data acquisition interval during which no current is supplied to the battery.

14. A method of charging a rechargeable battery in accordance with claim 13, wherein said monitoring step comprises measuring said voltage characteristic of the battery during the data acquisition interval of each said periodically repeating cycle.

15. A method of charging a rechargeable battery in accordance with claim 13, wherein said discharge pulse has an amplitude of approximately 2.5 times the amplitude of said charging pulse.

16. A method of charging a rechargeable battery in accordance with claim 15, wherein said charging pulse has a positive amplitude and said discharge pulse has a negative amplitude.

17. A method of charging a rechargeable battery having a voltage characteristic that varies in a predetermined manner with a charge state of the battery and for terminating said charging of the battery in response to the charge state of the battery when the battery has attained a full charge, comprising the steps of:

applying a substantially constant current to the battery;

monitoring said voltage characteristic as said substantially constant current is applied to the battery;

calculating a slope defining a variation of said monitored voltage characteristic with time to provide a slope characteristic which, as the battery is charged, decreases as a function of time to a bottom peak followed by a top peak followed by a decreasing slope;

identifying from said calculated slope a minimum slope of said bottom peak as said substantially constant current is applied to the battery;

defining a trigger threshold by adding a trigger value to said minimum slope;

identifying a first passage of said slope characteristic through said trigger threshold following the identifying of said minimum slope;

identifying a second passage of said slope characteristic through said trigger threshold following the identifying of said minimum slope; and terminating said applying of said substantially constant current to the battery when said calculated slope equals a termination threshold after said second passage of the slope characteristic through said trigger threshold.

18. A method of charging a rechargeable battery having a voltage characteristic that varies in a predetermined manner with a charge state of the battery and for terminating said charging of the battery in response to the charge state of the battery when the battery has attained a full charge, comprising the steps of:

(a) supplying electrical energy to the battery for charging of the battery;

(b) monitoring said voltage characteristic of the battery as said electrical energy is supplied to the battery;

(c) differentiating a variation of the monitored voltage characteristic with time as said electrical energy is supplied to the battery to provide a slope characteristic that decreases as a function of time to a bottom peak followed by a top peak followed by a decreasing slope;

(d) identifying in said slope characteristic a minimum slope of said bottom peak as said electrical energy is supplied to the battery;

(e) defining a trigger threshold by adding a predetermined trigger value to said minimum slope; and (f) terminating said supplying of electrical energy to the battery when said slope characteristic equals a termination value as said slope characteristic decreases following said top peak, said termination value being in a range defined between said minimum slope and said trigger threshold.

19. A method of charging a rechargeable battery in accordance with claim 18, further comprising a step of identifying passage of said slope characteristic through said trigger threshold, and wherein said terminating step further comprises terminating said supplying of electrical energy to the battery after said identifying of the passage of said slope characteristic through said trigger threshold.

20. A method of charging a rechargeable battery in accordance with claim 18, further comprising a step of defining said termination value as a non-zero fraction of the difference between said trigger threshold and said minimum slope.

21. A method of charging a rechargeable battery in accordance with claim 18, wherein said termination value comprises said minimum slope.

22. A method of charging a rechargeable battery in accordance with claim 18, further comprising steps of:

identifying a first passage of said slope characteristic through said trigger threshold as said slope characteristic increases from said bottom peak to said top peak; and identifying a second passage of said slope characteristic through said trigger threshold following said first passage of said slope characteristic through said trigger threshold;

wherein said termination step further comprises terminating said supplying of electrical energy to the battery after said identifying of said second passage of the slope characteristic through said trigger threshold.

23. A method of charging a rechargeable battery in accordance with claim 22, further comprising a step of defining said termination value as a non-zero fraction of the difference between said trigger threshold and said minimum slope.

24. A method of charging a rechargeable battery in accordance with claim 22, wherein said termination value comprises said minimum slope.

25. A method of charging a rechargeable battery in accordance with claim 18, further comprising a step of identifying passage of said slope characteristic through said trigger threshold as said slope characteristic increases from said bottom peak to said top peak, and wherein said terminating step further comprises terminating said supplying of electrical energy to the battery after said identifying of the passage of said slope characteristic through said trigger threshold.

26. A method of charging a rechargeable battery in accordance with claim 18, wherein said step (a) comprises supplying electrical energy to the battery at a substantially constant, predetermined charge rate for charging of the battery at said predetermined charge rate until said terminating of said supplying of electrical energy to the battery, further comprising a step of initiating application of electrical energy to the battery immediately prior to said step (a) by:

(i) initially applying electrical energy to the battery at an initiating charge rate comprising a non-zero fraction of said predetermined charge rate; and (ii) gradually increasing the rate at which electrical energy is applied to the battery from said initiating charge rate to said predetermined charge rate over a selected time interval of less than approximately 15 percent of a period necessary to fully charge the battery at said predetermined charge rate.

27. A method of charging a rechargeable battery in accordance with claim 26, wherein said selected time interval is approximately two minutes.

28. A method of charging a rechargeable battery in accordance with claim 26, wherein said initiating charge rate is approximately 20 percent of said predetermined charge rate.

29. A method of charging a rechargeable battery in accordance with claim 28, wherein said selected time interval is approximately two minutes.

30. A method of charging a rechargeable battery in accordance with claim 26, wherein said step (ii) comprises linearly increasing the rate at which electrical energy is applied to the battery from said initiating charge rate to said predetermined charge rate.

31. A method of charging a rechargeable battery in accordance with claim 26, wherein said step (a) uninterruptedly follows said step (ii) so that electrical energy is applied to the battery continuously between said step (ii) and said step (a).

32. A method of charging a rechargeable battery in accordance with claim 18, wherein said step (a) comprises supplying a substantially constant, predetermined current to the battery, said predetermined current comprising a periodically repeating fixed-length cycle of length $t_{cycle}$ and comprising a substantially constant and predetermined amplitude charging pulse having a fixed duration $t_{CPW}$ of less than said fixed-length cycle length $t_{cycle}$ and applied to the battery for charging of the battery at a predetermined charge rate until said terminating of said supplying of electrical energy to the battery.

33. A method of charging a rechargeable battery in accordance with claim 32, further comprising a step of initiating application of charging current to the battery immediately prior to said step (a) by:

(i) initially applying electrical energy to the battery at an initiating charge rate comprising a non-zero fraction of said predetermined charge rate by applying electrical current to the battery at a periodically repeating fixed-length cycle of said length $t_{cycle}$ and comprising a substantially constant amplitude charging pulse of said predetermined amplitude and having a duration of a selected non-zero fraction of said duration $t_{CPW}$; and (ii) gradually increasing the rate at which electrical energy is applied to the battery, over a selected time interval of less than approximately 15 percent of a period necessary to fully charge the battery at said predetermined charge rate, from said initiating charge rate to said predetermined charge rate by gradually increasing the duration of said charging pulse from said non-zero fraction of said duration $t_{CPW}$ to said duration $t_{CPW}$.

34. A method of charging a rechargeable battery in accordance with claim 33, wherein said periodically repeating cycle further comprises a substantially constant amplitude discharge pulse following said charge pulse and a data acquisition interval following said discharge pulse and during which no current is applied to the battery.

35. A method of charging a rechargeable battery in accordance with claim 33, wherein said selected time interval is approximately two minutes.

36. A method of charging a rechargeable battery in accordance with claim 33, wherein said initiating charge rate is approximately 20 percent of said predetermined charge rate.

37. A method of charging a rechargeable battery in accordance with claim 36, wherein said selected time interval is approximately two minutes.

38. A method of charging a rechargeable battery in accordance with claim 33, wherein said step (ii) comprises linearly increasing the rate at which electrical energy is applied to the battery from said initiating charge rate to said predetermined charge rate.

39. A method of charging a rechargeable battery in accordance with claim 33, wherein said step (a) uninterruptedly follows said step (ii) so that electrical energy is applied to the battery continuously between said step (ii) and said step (a).

40. In a method of charging a rechargeable battery having a voltage characteristic that varies in a predetermined manner with a charge state of the battery and for terminating said charging of the battery in response to the charge state of the battery when the battery has attained a full charge, a method of initiating application of charge to the battery prior to supplying electrical energy to the battery at a substantially constant, predetermined charge rate at which the battery is to be charged until said termination of battery charging in response to the charge state of the battery when the battery has attained a full charge, comprising the steps of:

(a) initially applying electrical energy to the battery at an initiating charge rate comprising a non-zero fraction of said predetermined charge rate; and (b) gradually increasing the rate at which electrical energy is applied to the battery from said initiating charge rate to said predetermined charge rate over a selected time interval of less than approximately 15 percent of a period necessary to fully charge the battery at said predetermined charge rate.

41. In a method of charging a rechargeable battery in accordance with claim 40, wherein said selected time interval is approximately two minutes.

42. In a method of charging a rechargeable battery in accordance with claim 40, wherein said initiating charge rate is approximately 20 percent of said predetermined charge rate.

43. In a method of charging a rechargeable battery in accordance with claim 42, wherein said selected time interval is approximately two minutes.

44. In a method of charging a rechargeable battery in accordance with claim 40, wherein said step (a) comprises linearly increasing the rate at which electrical energy is applied to the battery from said initiating charge rate to said predetermined charge rate.

45. In a method of charging a rechargeable battery in accordance with claim 40, wherein said step (a) uninterruptedly precedes the supplying of electrical energy to the battery at the substantially constant, predetermined charge rate at which the battery is to be charged until said termination of battery charging.

46. In a method of charging a rechargeable battery in accordance with claim 40 and in which the electrical energy is supplied to the battery at the substantially constant, predetermined charge rate as a periodically repeating fixed-length cycle of length $t_{cycle}$ including a substantially constant and predetermined amplitude charging pulse having a fixed duration $t_{CPW}$ of less than said fixed-length cycle length $t_{cycle}$ and applied to the battery for charging of the battery at the predetermined charge rate until said termination of battery charging in response to the charge state of the battery when the battery has attained a full charge, said step (a) comprising applying electrical energy to the battery at a periodically repeating fixed-length cycle of said length $t_{cycle}$ which includes a substantially constant amplitude charging pulse of said predetermined amplitude and having a duration of a selected non-zero fraction of said duration $t_{CPW}$; and said step (b) comprising gradually increasing the rate at which electrical energy is applied to the battery, over the selected time interval, by gradually increasing the duration of said charging pulse from said non-zero fraction of said duration $t_{CPW}$ to said duration $t_{CPW}$.

47. In a method of charging a rechargeable battery in accordance with claim 46, wherein said periodically repeating cycle further comprises a substantially constant amplitude discharge pulse following said charge pulse and a data acquisition interval following said discharge pulse and during which no current is applied to the battery.

48. In a method of charging a rechargeable battery in accordance with claim 46, wherein said selected time interval is approximately two minutes.

49. In a method of charging a rechargeable battery in accordance with claim 46, wherein said initiating charge rate is approximately 20 percent of said predetermined charge rate.

50. In a method of charging a rechargeable battery in accordance with claim 49, wherein said selected time interval is approximately two minutes.

51. In a method of charging a rechargeable battery in accordance with claim 46, wherein said step (b) comprises linearly increasing the rate at which electrical energy is applied to the battery from said initiating charge rate to said predetermined charge rate.

52. In a method of charging a rechargeable battery in accordance with claim 46, wherein said step (a) uninterruptedly precedes the supplying of electrical energy to the battery at the substantially constant, predetermined charge rate at which the battery is to be charged until said termination of battery charging.

* * * * *